Sept. 29, 1970      B. WEISSMAN      3,530,582

DENTAL PROSTHETIC STRUCTURE

Filed Aug. 26, 1968

INVENTOR.
BERNARD WEISSMAN

BY Friedman & Goodman
Attorneys

United States Patent Office 3,530,582
Patented Sept. 29, 1970

3,530,582
DENTAL PROSTHETIC STRUCTURE
Bernard Weissman, 304 Ashland Place,
Brooklyn, N.Y. 11217
Filed Aug. 26, 1968, Ser. No. 755,292
Int. Cl. A61c 5/08
U.S. Cl. 32—12                                   6 Claims

ABSTRACT OF THE DISCLOSURE

A dental prosthetic structure consisting of at least two interconnected crowns wherein the link forming the connection has spherical heads at opposite ends respectively embedded in the crowns so as not to interfere with the natural movement of the teeth relative to each other, and such link in combination with a removable body serves as an effective means of positioning the link during investment molding of the crowns about the spherical heads and also of insuring encasement only of these spherical heads so that the aforesaid relative movement is preserved in the resulting structure.

---

The present invention relates generally to an improved dental prosthetic structure, and more particularly to an interconnected structure comprising at least two molded crowns having a desirable extent of universal movement relating to each other as well as to an arrangement of parts for facilitating the molding of such structure.

As generally understood, each tooth is rooted in a membrane which is effective as a cushion against strain or shock as may normally result from mastication. The addition to teeth of prosthetic structures, such as, for example, an arrangement of at least two crowns, the structure being specifically considered herein, usually has the undesirable effect of negating the natural relative movement capacity of the teeth capped with the crowns. Prior attempts, as exemplified by U.S. Pat. No. 2,129,861, to overcome this defect by employing connecting links having spherical heads have not proved successful due probably to the inability to so embed the spherical head in a crown that it can partake of rotative movement. For example, in the referred to patent, the encasement of the non-spherical shaped stem supporting the spherical head within the molded crown obviously minimizes the extent of rotative movement of the head and thus nullifies the obtaining of any significant benefits from having the head.

Broadly, it is an object of the present invention to provide an improved interconnected arrangement of crowns, preferably of gold and made by the investment molding process, overcoming the foregoing and other shortcomings of the prior art. Specifically, it is an object to provide a structure of molded crowns connected by a link, preferably also of gold, having embedded spherical heads so as to promote relative movements between the crowns.

A dental prosthetic crown structure demonstrating objects and advantages of the present invention includes a double, spherical headed link connecting the interproximal walls of two molded crowns and characterized in that only the heads are encased in the crowns, the link body or stem connecting the heads being protected from encasement during the investment molding of the crowns.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
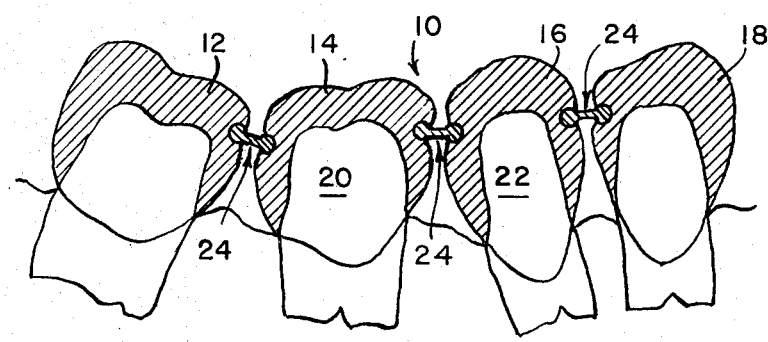
FIG. 1 is a diagrammatic elevational view of a dental prosthetic structure according to the present invention.

Reference is now made to the drawings and in particular to the diagrammatic showing in FIG. 1 of a dental prosthetic structure, generally designated 10, consisting of an interconnected arrangement of four investment molded crowns 12, 14, 16 and 18. It will be understood, however, that a lesser number of crowns may be used for the structure 10 so long as there are at least two such crowns and they are applied to adjacently located teeth. For brevity sake, the description of the present invention will therefore be confined to a prosthetic structure consisting of the two crowns, 14, 16, applied to the adjacent teeth 20, 22 and interconnected by improved link 24, the improvements, more particularly, permitting relative movements between the teeth 20, 22 and thereby preserving natural relative tooth movement effective to withstand the normal strain of mastication. This is in sharp contrast to a typical prior art prosthetic structure consisting, for example, of adjacent crowns 14, 16 but including a rigid connection between these crowns which, of course, prevents any relative movement in the teeth capped with these crowns.

As generally understood, dental crowns, of which the crowns 14, 16 are exemplary, are molded to their desired shape for positioning or attachment to previously prepared teeth by the well known investment molding process, the molding steps and details of which are so well known as to require no discussion herein. It is sufficient to note only that this molding process results in a faithful casting of the crowns 14, 16 with the connecting link 24, or more particularly its opposite end spherical head portions 24b, 24c embedded in each of these crowns. Specifically, and as best shown in the enlarged sectional view of FIG. 2, it is desirable that the link 24, in order to permit relative movements in the teeth 20, 22, occupy a precise embedded or encased position within the crowns 14, 16 in its operative connected position between opposing points in the interproximal walls 14a, 16a of the crowns 14, 16, all as will now be described in detail.

Figure 2:
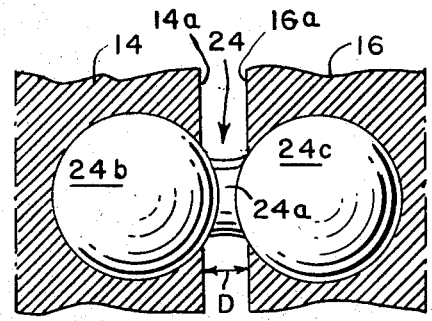
FIG. 2 is a partial elevational view, on a greatly enlarged scale, showing further structural details of the prosthetic structure, particularly of the connecting link thereof.
Figure 3:
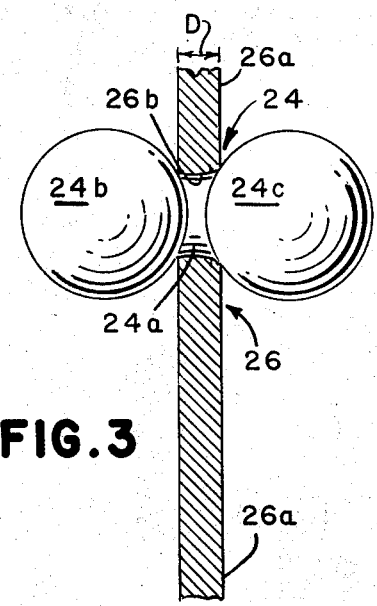
FIG. 3 is a side elevational view, in section, taken on line 3—3 of FIG. 4, of a novel article of manufacture including the link of FIG. 2 in combination with a molding spacing member.
Figure 4:
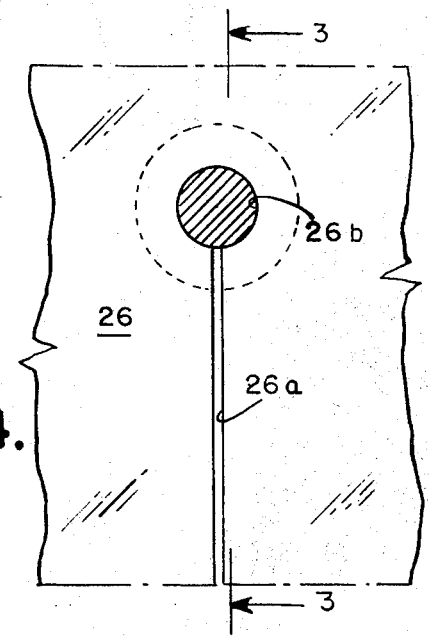
FIG. 4 is a front elevational view of the article of manufacture.

That is, at the interproximal walls 14a, 16a, the spacing therebetween is, according to the present invention, effectively set at a prescribed dimension D which, as illustrated in FIG. 2, corresponds to the size of the rod-like link body 24a. In other words, encasement of the link 24 by the crowns 14, 16 is limited to the spherical heads 24b, 24c and specifically excludes the link body 24a. As may be best appreciated from FIG. 3, the foregoing is achieved by using a planar body 26, of a thickness D, to protect the link body 24a from encasement during the investment molding process. To this end, the body 26 is of a sufficient size or extent to present a peripheral edge 26a extending laterally of the link 24 and thereby effectively serves as a holding surface during the investment molding process when the crowns 14, 16 are molded about the spherical link heads 24b, 24c. After molding of the crowns 14, 16 is completed to produce the interconnected prosthetic structure illustrated in FIG. 2, the body 26 is removed from about the link body 24a. Specifically, the body 26 is fabricated of a hand-bendable material and, as best shown in FIG. 4, has a slot 26a extending from a free edge to the opening 26b which accommodates the link body 24a. Thus, by merely bending apart the body segments created by the slot 26a and thus increasing the extent of the slot, the body 26 is easily removed from about the link body 24a. Alternatively, the body 26 may be fabricated of a nickel-silver alloy and dissolved from about the link 24 by nitric acid which has no adverse effect on the gold crowns 14, 16 and link 24.

Figure 5:
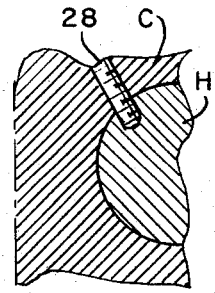
FIG. 5 is a partial, enlarged sectional view illustrating a contemplated means of modifying the functioning of the connecting link of the prosthetic structure hereof.

In instances where it is desired to eliminate any relative movement between teeth having an interconnected crown structure 10 in accordance with the present invention, this is readily done, as illustrated in FIG. 5, by drilling a hole through the crown C and partially into one spherical head H, and then inserting a threadable element 28 therein, which in an obvious manner, holds the spherical head H against any rotatable movement.

From the foregoing, it should be readily appreciated that there has been described not only a noteworthy dental prosthetic structure 10 consisting of at least two crowns 14, 16 connected by the link 24, but also a noteworthy article of manufacture consisting of the combination of the link 24 and the body 26 removably connected thereto which, during the investment molding of the crowns 14, 16 about the link 24, greatly facilitates producing the improved structure 10 wherein there is no encasement of the link body 24a. For completeness sake, it should be noted that the mention hereof of the relative movement of the capped teeth was intended only as illustrative of the benefits to be derived from the improved structure 10 and that other noteworthy benefits also result. For example, the placement of the interconnected crowns 14, 16 on teeth which are badly out-of-parallel is obviously facilitated by the relative universal movements of the crowns. Further, it will be understood that any one of many appropriate techniques may be used to insure that the spherical heads 24b, 24c are not prevented by a friction fit or the like from partaking of rotative movement in their operative encased positions in the crowns 14, 16. One preferred technique is to nickel plate the link 24 which, for all practical purposes, minimizes this possibility.

What is claimed is:

1. In a dental prosthetic structure for at least two adjacent teeth, an improved link interconnecting a cooperating pair of investment molded crowns having in their interproximal walls at least two points operatively arranged a prescribed distance opposite each other as determined by a removable spacing body of a thickness corresponding to said prescribed distance, said spacing body having an interposed position between said interproximal walls during said investment molding and thereafter removed, said improved link comprising a rod-like body of a size selected to extend with its opposite ends in close proximity to and externally adjacent said two points on said interproximal walls of said crowns and, on each said end, a spherical head extending therebeyond and having an operative enclosed position within a cooperating one of said crowns so as to have a predetermined extent of rotative movement unimpeded by said rod-like body, said rotative movement of said crowns with respect to said spherical heads of said link permitting each of said adjacent teeth to be movable relative to each other within the limits of the extents of rotative movement of said two spherical heads.

2. As an article of manufacture, a link as defined in claim 1 in combination with a body removably mounted on said rod-like link body and of an extent having a peripheral edge extending beyond said link, whereby said peripheral edge serves as a holding surface for said link during the investment molding of said crowns about said heads and also effectively prevents any encasement of said rod-like link body within said molded crowns.

3. An article of manufacture as defined in claim 2 wherein the length of said rod-like body and the thickness of said removable body are substantially equal.

4. A dental prosthetic structure comprising at least two metallic crowns interconnected in their interproximal regions by means of a metallic link, said link being provided with enlarged spherical head portions embedded in said crowns to permit universal rotative movement of each of the crowns with respect to said link and to permit said crowns to be movable relative to each other in dependence upon the rotative movement of said crowns with respect to said enlarged spherical head portions.

5. As an article of manufacture, a link as defined in claim 4 mounted in a substantially planar body with said enlarged spherical head portions protruding from opposite sides of said body.

6. An article of manufacture as defined in claim 5 wherein said body has two separated segments operatively engaged about said link and is fabricated of a hand-bendable material such that said segments are adapted to be deformed to enlarge the separation therebetween and thereby permit the disengagement of said body from said link.

References Cited

UNITED STATES PATENTS 2,227,735   1/1941   Morton _____ 32—6
2,350,196   5/1944   Saffir _____ 32—5

ROBERT PESHOCK, Primary Examiner